United States Patent
Hall et al.

(10) Patent No.: US 12,398,815 B1
(45) Date of Patent: Aug. 26, 2025

(54) SANITARY PULSE VALVE

(71) Applicant: Control Concepts, Inc., Brooklyn, CT (US)

(72) Inventors: Aaron G. Hall, North Grosvenordale, CT (US); Henry D Tiffany, III, Juneau, AK (US)

(73) Assignee: Control Concepts, Inc, Brooklyn, CT (US)

( * ) Notice: Subject to any disclaimer, the term of this patent is extended or adjusted under 35 U.S.C. 154(b) by 0 days.

(21) Appl. No.: 19/047,001

(22) Filed: Feb. 6, 2025

(51) Int. Cl.
*F16K 15/02* (2006.01)
*F16K 25/00* (2006.01)

(52) U.S. Cl.
CPC .......... *F16K 15/025* (2013.01); *F16K 25/005* (2013.01)

(58) Field of Classification Search
CPC ............... F16K 15/025; F16K 2200/40; F16K 2200/401; F16K 2200/402; Y10T 137/7847; Y10T 137/7848; Y10T 137/7849
See application file for complete search history.

(56) References Cited

U.S. PATENT DOCUMENTS

| | | | |
|---|---|---|---|
| 5,271,598 A | 12/1993 | Hohenshil et al. | |
| 5,853,160 A | 12/1998 | Hurdis et al. | |
| 6,095,184 A | 8/2000 | Neff et al. | |
| 7,640,944 B2 * | 1/2010 | Zakai | F16K 47/011 137/220 |
| 8,770,221 B2 * | 7/2014 | Ishitoya | F16K 31/1221 92/162 R |
| 8,985,141 B2 | 3/2015 | Ishitoya et al. | |
| 8,998,166 B2 | 4/2015 | Adams | |
| 10,221,868 B2 | 3/2019 | Matsumoto | |
| 10,865,904 B2 * | 12/2020 | Bornand | B23P 15/001 |
| 11,326,712 B2 | 5/2022 | Choate et al. | |
| 11,779,872 B2 | 10/2023 | Jenkins et al. | |
| 2010/0147403 A1 | 6/2010 | Bresnahan | |

OTHER PUBLICATIONS

Document Title: "USDA Certificate of Acceptance—Sanitary Pulse Valve 1.5 SPV" Authors: USDA Dairy Grading Branch, Publication Date: Jan. 28, 2025.

* cited by examiner

*Primary Examiner* — Michael R Reid

(57) ABSTRACT

A sanitary pulse valve, USDA-certified for compliance with sanitary design standards, ensuring suitability for hygienic applications in food, dairy, and pharmaceutical processing is disclosed. The valve comprises a plunger body with first and second cylindrical chambers in constant fluid communication, where the second chamber includes a throttle valve chamber for regulating flow. A plunger assembly made from PEEK thermoplastic operates within the chambers, transitioning between open and closed positions to control fluid passage. The plunger assembly includes a sealing ring with an approximately $1/16$-inch break for pressure equalization and an approximately 0.01-inch gap between the plunger and internal walls of the plunger body for precise fluid communication. The valve features an outlet body and a chamfered sealing edge (approximately 0.032 inches wide) disposed opposite the outlet port for tight sealing against the plunger body. All internal surfaces are RA32 finish or better, ensuring compliance with food safety standards.

21 Claims, 10 Drawing Sheets

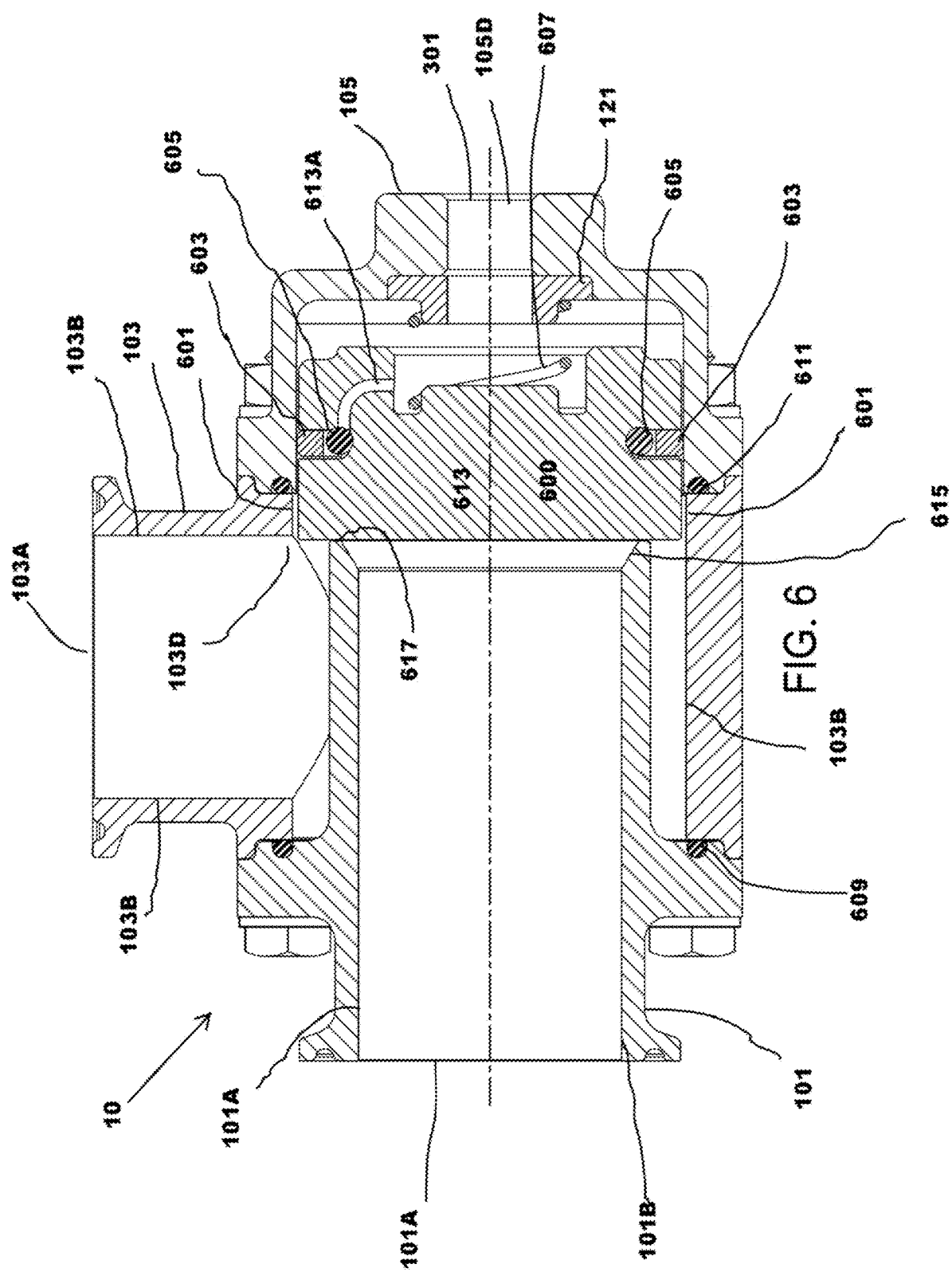

SANITARY PULSE VALVE

1. FIELD OF USE

This invention relates to a sanitary pulse valve, specifically designed for high-precision control of pressurized fluid flow in applications requiring compliance with food safety standards. The valve is suitable for food and dairy processing, pharmaceutical manufacturing, and other industries demanding hygienic conditions.

2. DESCRIPTION OF PRIOR ART (BACKGROUND)

Pulse valves are commonly used for regulating the flow of compressed air or other fluids in systems requiring precise control. However, traditional designs often incorporate internal fasteners, diaphragms, or sharp interior angles, making them unsuitable for food-grade or hygienic environments. These designs are prone to contamination, difficult to clean, and may not meet regulatory standards. This invention addresses these challenges by providing a durable, hygienic, and efficient pulse valve.

BRIEF SUMMARY

The invention provides a food-grade sanitary pulse valve with these features: A plunger body comprising first and second internal chambers, both internal chambers are machined to an RA32 finish or smoother surface finish to prevent microbial contamination. The plunger is constructed from PolyEtherEtherKetone (PEEK) thermoplastic, designed for durability and compliance with food safety standards. It will be appreciated that the PEEK thermoplastic may be any suitable PEEK thermoplastic such as carbon filled PEEK, glass filled PEEK, static dissipative PEEK, or USP Class VI-certified PEEK. The invention also includes sealing mechanisms, including chamfered edges and O-rings, to ensure tight seals and prevent leakage. The invention also includes an outlet body with a compressed fluid outlet port and supply port. A throttle valve chamber within the second internal chamber regulates fluid flow. The invention also includes features such as radiused interior angles (minimum 0.032-inch radius) and the absence of internal fasteners or diaphragms.

The invention is directed towards a sanitary pulse valve (SPV) for providing controlled bursts of a pressurized fluid. The SPV pulse valve includes a SPV plunger body. The SPV plunger body includes a first SPV internal chamber defining a substantially cylindrical interior cavity having a first SPV wall; a second SPV internal chamber defining a substantially cylindrical interior cavity having a second SPV wall, and the second SPV internal chamber is in constant fluid communication with the first SPV internal chamber. The second internal chamber includes a throttle valve chamber. The SPV pulse valve also includes a SPV outlet body having a compressed fluid outlet port and sealing edge disposed opposite the fluid outlet port. The SPV pulse valve also includes a center body having a compressed fluid supply port for supplying compressed fluid to the compressed fluid outlet port.

The invention is also directed towards a pulse valve having a stainless-steel machined (SSM) plunger body. The SSM plunger body includes a first internal chamber defining a first substantially cylindrical interior cavity having a first wall; a second internal chamber defining a second substantially cylindrical interior cavity having a second wall, and the second internal chamber is in constant fluid communication with the first internal chamber. The second internal chamber includes a throttle valve chamber. The pulse valve includes a SSM outlet body having a compressed fluid outlet port and a sealing edge disposed opposite the outlet port. The pulse valve also includes a SSM center body disposed between the SSM plunger body and the SSM outlet body. The SSM center body includes a compressed fluid supply port for supplying compressed fluid to the compressed fluid outlet port, and the compressed fluid supply port is in constant fluid communication with the first internal chamber. The SSM plunger body, the SSM center body, and the SSM outlet body interior surfaces are machined to a RA32 finish or better. The pulse valve does not comprise a diaphragm and the pulse valve does not have interior radii less than 0.032 inch radius and the pulse valve has no internal fasteners.

In another embodiment the invention is directed towards a food grade pulse air valve. The food grade pulse air valve includes a plunger body having a first pressure zone and a second pressure zone; an annealed PolyEtherEtherKetone (PEEK) thermoplastic plunger assembly, disposed between the first pressure zone and the second pressure zone. The plunger assembly includes a sealing plunger ring disposed around the annealed PEEK thermoplastic plunger substantially separating the first and second pressure zones, and wherein the annealed PEEK thermoplastic plunger ring includes a 1/16-inch break, or a functionally equivalent dimension, for maintaining constant communication between the first pressure zone and a second pressure zone. The pulse air valve also includes an outlet body having a compressed air outlet port and a sealing edge for sealing against the annealed PEEK thermoplastic plunger when the plunger is in a closed position. The sealing edge for sealing against the annealed PEEK thermoplastic plunger is approximately 0.032-inches wide or a functionally equivalent dimension. The pulse air valve also includes a center body disposed between the plunger body and the outlet body. The center body includes a compressed air supply port for supplying compressed air to the compressed air outlet port, and the compressed air supply port is in constant fluid communication with the first pressure zone. When pressure in the first pressure zone substantially equals pressure in the second pressure zone the annealed PEEK thermoplastic plunger is sealed against the outlet body chamfered end stopping compressed air flow between the compressed air supply port and the compressed air outlet port.

BRIEF DESCRIPTION OF THE DRAWINGS

FIG. 6 is a side cutaway view of the pulse valve in the closed position, taken along the line 6-6 in FIG. 5;

FIGS. 1-14 illustrates the pulse valve's sanitary design, compliant with USDA certification requirements under Equipment Acceptance Certificate USDA 1.5 SPV.

DETAILED DESCRIPTION

Figure 1:
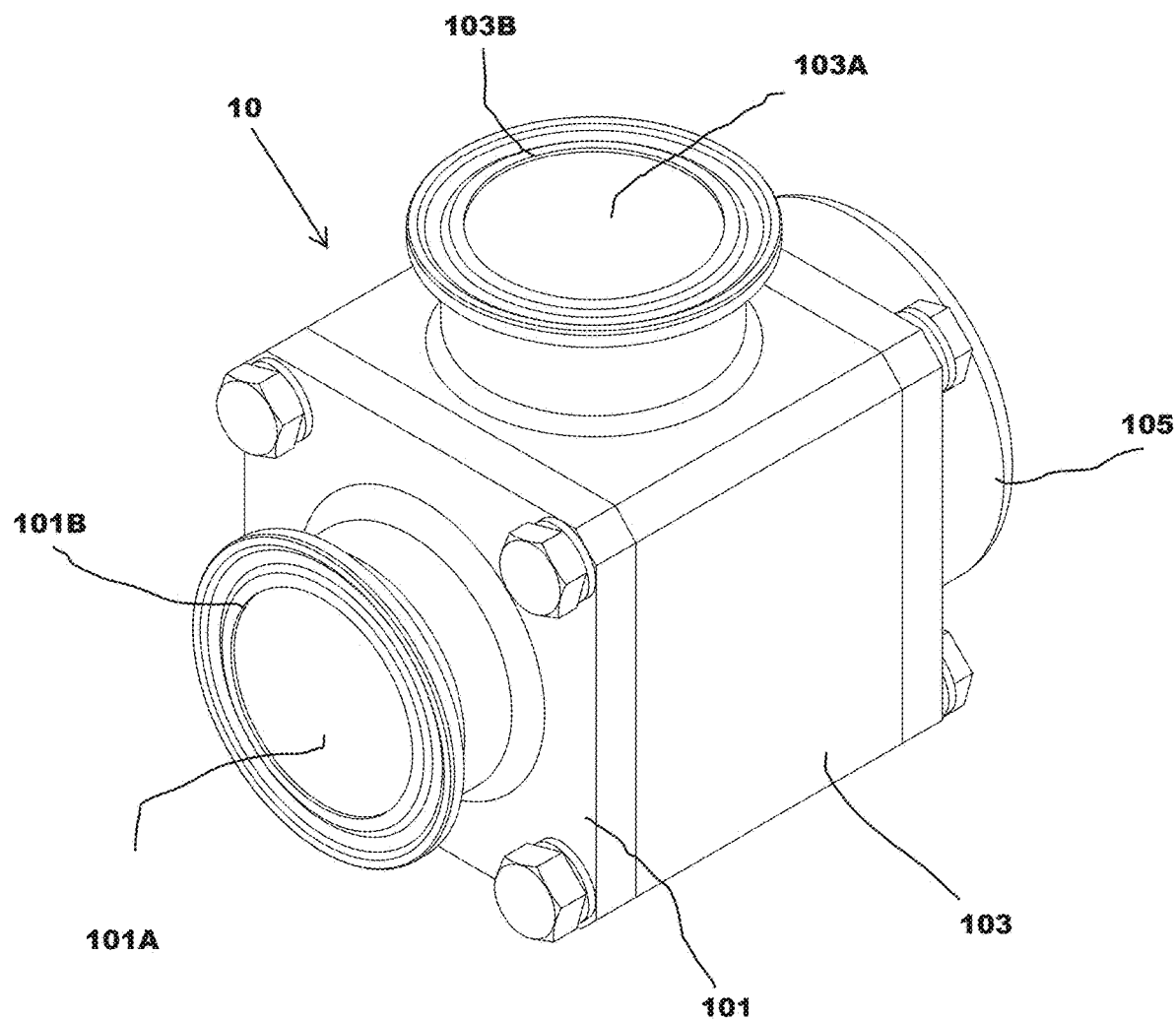
FIG. 1 is a perspective view of a pulse valve according to this invention.

Food-grade equipment as used herein refers to machinery and tools that are designed, made, and maintained to meet strict hygiene and safety standards for food processing, preparation, or packaging. These standards make sure the equipment does not contaminate food with harmful chemicals, toxins, or microorganisms and is easy to clean and sanitize.

General Key Characteristics of Food-Grade Equipment.
- Non-Toxic: Materials must not leach harmful substances into food.
- Corrosion-Resistant: Metals like stainless steel (e.g., 304 or 316 grades) are used herein due to their resistance to rust, corrosion, and reaction with food products.
- Non-Absorbent: Surfaces should not absorb food, water, or cleaning chemicals, which can harbor bacteria.
- Chemical Compatibility: Materials must withstand cleaning agents and sanitizers used in the food industry.
- Smooth Surfaces: Equipment must have smooth and polished surfaces to prevent food particles from sticking, which can lead to bacterial growth. All internal surfaces herein are RA32 finish or better.
- No Crevices or Gaps: Joints, welds, and connections should be seamless to avoid areas where food or debris can collect.
- Ease of Cleaning: Equipment must be designed for easy disassembly and cleaning.
- Drainability: Equipment should allow for proper drainage to avoid stagnant water or residue.

Food grade equipment is defined by various U.S. standards such as:
- FDA Compliance (USA): Materials in contact with food must meet regulations by the U.S. Food and Drug Administration (FDA).
- USDA Certification: Some equipment, especially used in meat or poultry processing, must meet USDA standards.
- NSF International Certification: Ensures equipment meets safety and sanitation standards.
- ISO Standards (e.g., ISO 22000): International standards for food safety management.

Food grade equipment must be hygienically fabricated:
- Surfaces that come into contact with food are made with approved coatings or finishes (e.g., electropolished stainless steel). As used herein all internal surfaces are RA32 finish.
- Non-metallic materials like food-grade plastics must also comply with food safety standards. Plastic, as used herein is U.S. Food & Drug Administration (FDA) compliant polyetheretherketone (PEEK) thermoplastic. PEEK food grade material is resistant to high temperatures, chemicals, and wear, ensuring the integrity of food products during processing, packaging, and transportation. It also provides a non-toxic and non-reactive surface, preventing any contamination risks and promoting food safety.
- Rubber O-rings, as used herein may be any suitable O-ring such as TM Viton O-rings or any O-ring meeting the requirements of U.S. code 21 CFR 177.2600.

Food grade materials must endure repeated exposure to temperature changes, cleaning processes, and wear without degradation or compromising food safety.

Regulatory Compliance & USDA Certification

The present invention, the Food-Grade Sanitary Pulse Valve, Model USDA 1.5 SPV, has been officially reviewed and accepted by the United States Department of Agriculture (USDA) Agricultural Marketing Service under the Dairy Grading Branch. The USDA Equipment Acceptance Certificate, issued on Jan. 28, 2025, confirms compliance with:
- USDA Guidelines for the Sanitary Design and Fabrication of Dairy Processing Equipment (February 2022).
- Hygienic construction standards for dairy, food, and beverage processing equipment.

This certification ensures the pulse valve meets strict regulatory requirements for food-grade environments. The USDA Equipment Acceptance Certificate is included as Appendix A in this application.

Referring now to FIG. 1. The food grade pulse valve 10 in FIG. 1 includes these components and features shown in FIGS. 1-15: outlet body 101, outlet port 101A, center body 103, inlet port 103A, first internal chamber or pressure zone 103D, plunger body 105, second internal chamber or pressure zone 105D, throttle valve chamber 301, gap 601 between plunger 613 and plunger body 105, plunger ring 603, plunger ring gap 603A, O-ring 605 under plunger ring 603, spring 607, O-ring 609 between outlet body 101 and center body 103, O-ring 611 between center body 103 and plunger body 105, plunger slot 613A, outlet body 101 having chamfered end 615 and sealing edge 617, and spring seat 121. Also included are suitable nuts 710 (×4), bolt head washers 712 (×4), nut washers 712A (×4), and bolts 714 (×4). It will be appreciated that the pulse valve 10 in FIG. 1 can be rapidly disassembled for cleaning by removing the four each, bolts 714, washers 712, and nuts 710.

Still referring to FIG. 1 there is shown a perspective view of a pulse valve 10 according to this invention. Shown in FIG. 1 is 101 Outlet Body: The external housing of the valve where the compressed fluid exits. Includes the 101A Outlet Port for fluid discharge. 103 Center Body: The middle section connecting the outlet body and the plunger body. Includes the 103A Inlet Port for compressed fluid entry. 105 Plunger Body: The section housing the plunger and internal chambers, controlling fluid flow. 103B indicates that all interior surfaces are food grade RA32 finish.

Figure 2:
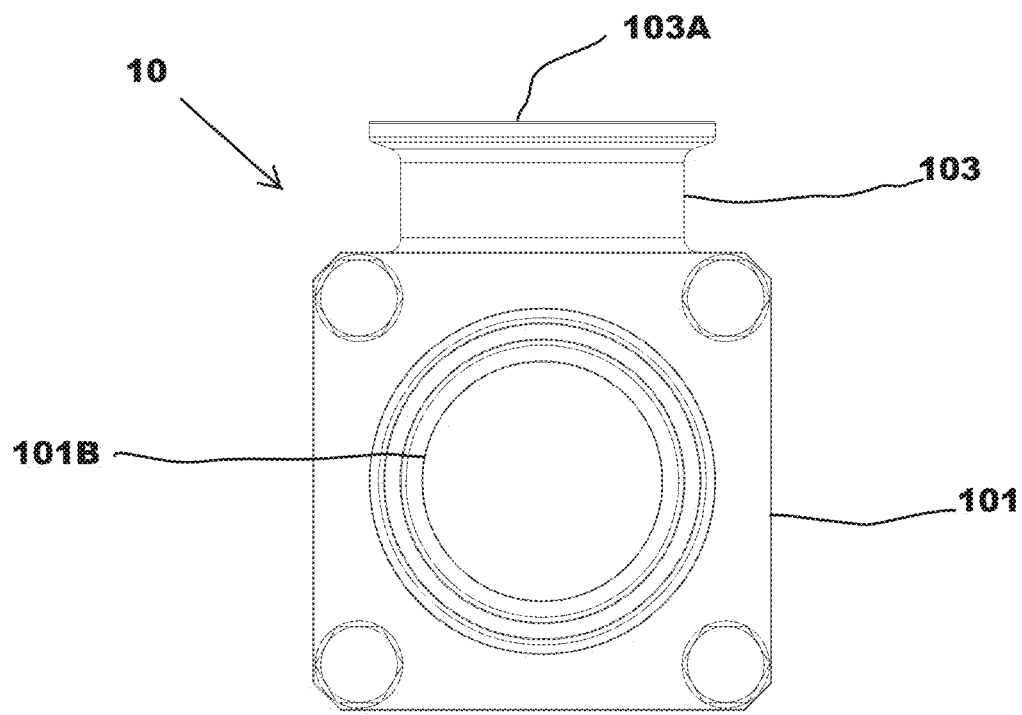
FIG. 2 is an end view of an outlet port of the pulse valve in FIG. 1.

Referring also FIG. 2 there is shown an end view of an outlet port 101A of the pulse valve 10 in FIG. 1. 101B indicates that all interior surfaces are food grade RA32 finish.

Figure 3:
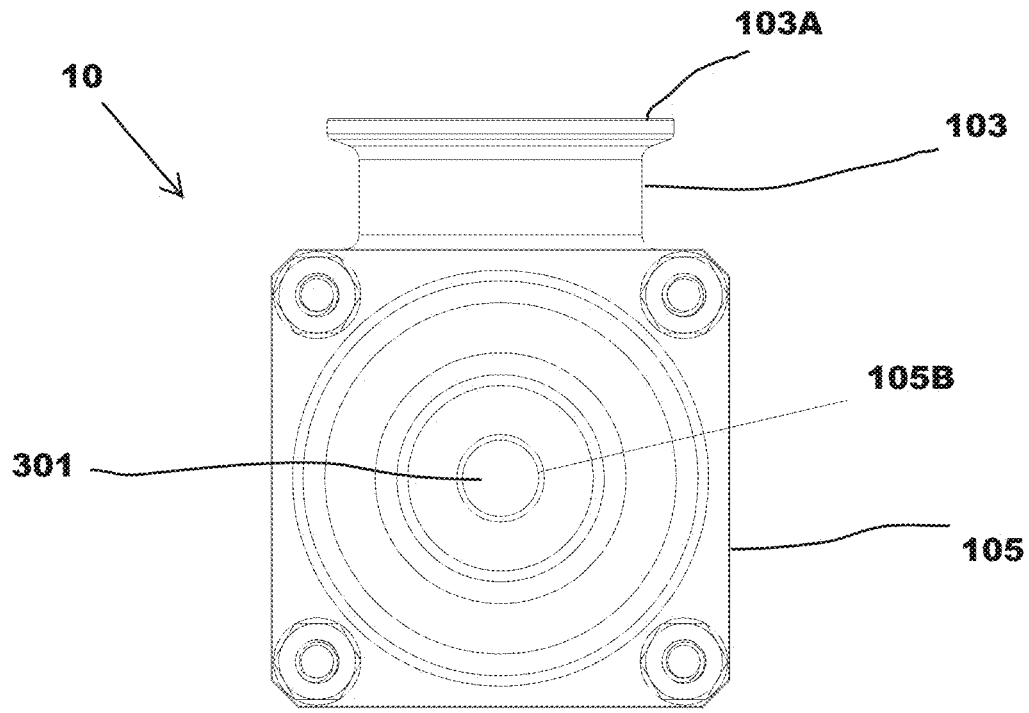
FIG. 3 is an end view of a throttle port of the pulse valve in FIG. 1.

Referring also to FIG. 3 there is shown an end view of the throttle valve port 301 of the pulse valve 10 in FIG. 1. 105B indicates that all interior surfaces are food grade RA32 finish.

Figure 4:
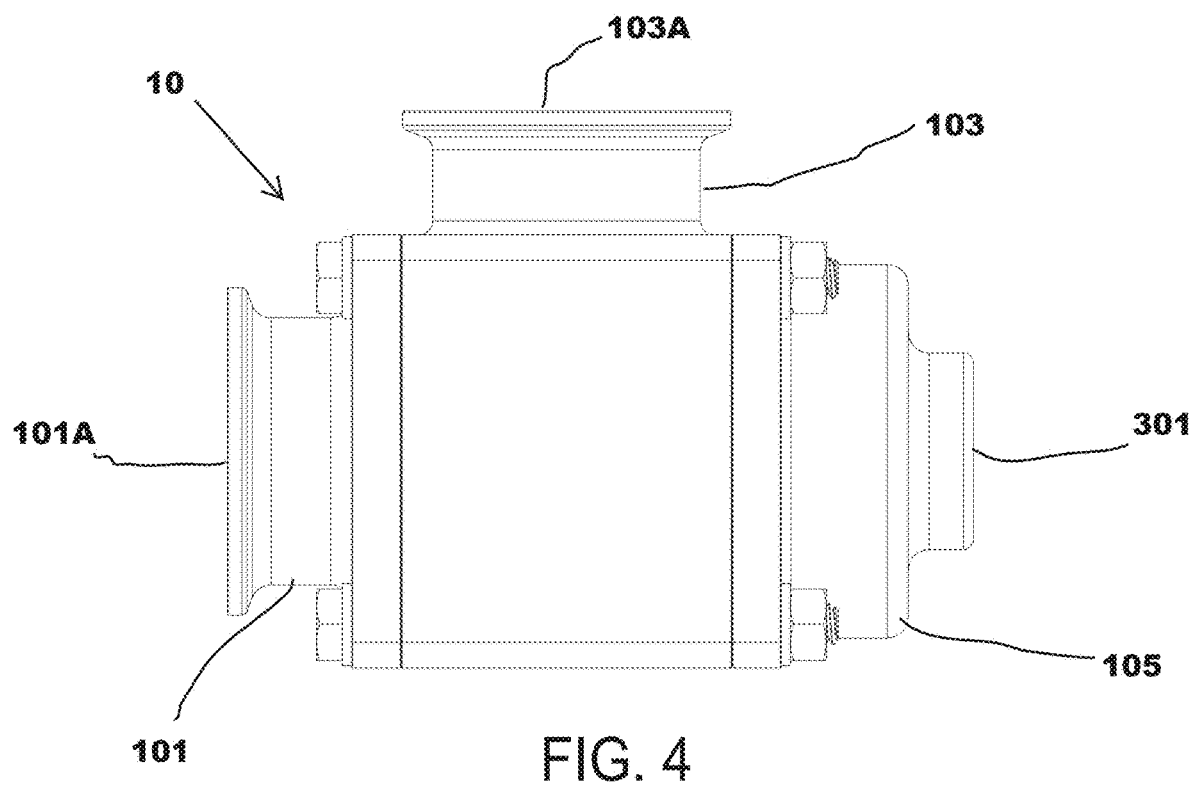
FIG. 4 is a side view of the pulse valve in FIG. 1.

Referring also to FIG. 4 there is shown a side view of the pulse valve 10 in FIG. 1.

Figure 5:
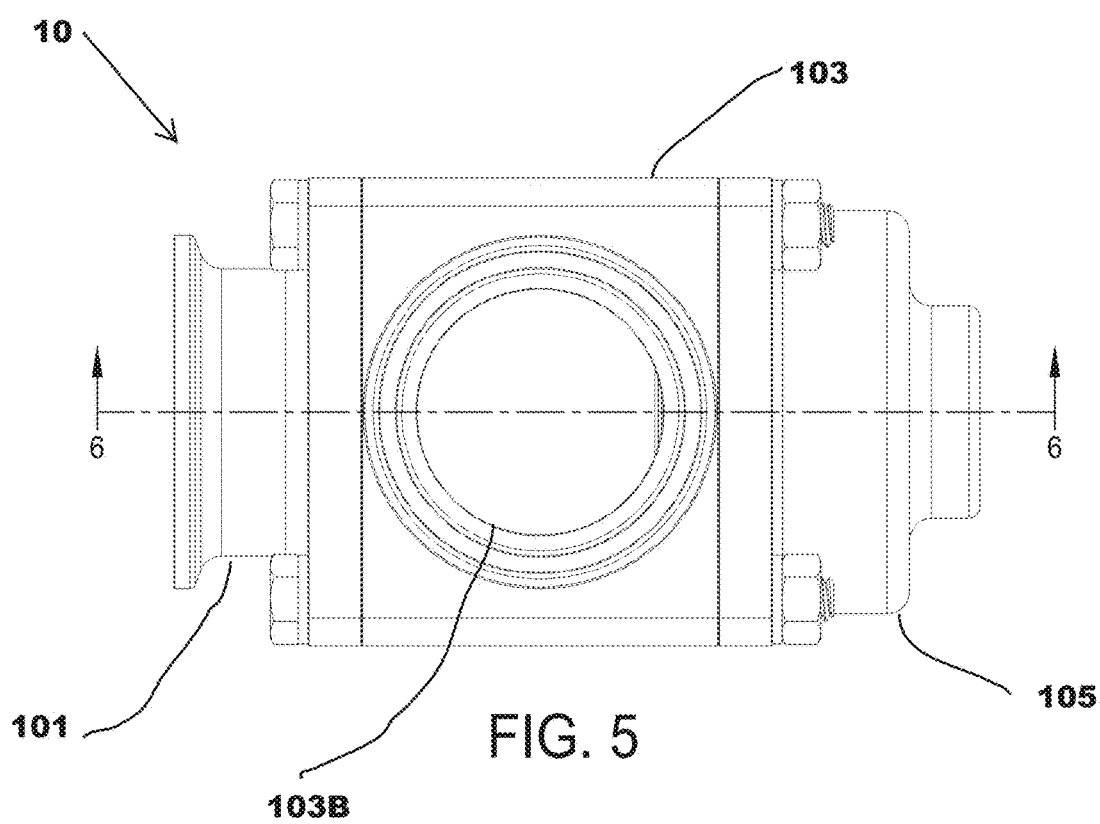
FIG. 5 is a top view of the pulse valve in FIG. 1.

Referring also to FIG. 5 there is shown a top view of the pulse valve 10 in FIG. 1.

Referring also to FIG. 6 there is shown a side cutaway view taken along the line 6-6 in FIG. 5. FIG. 6 shows the following. Internal Chambers 103D, 105D. 103D First Internal Chamber: The initial cylindrical cavity in the plunger body, forming the primary pressure zone. 105D Second Internal Chamber: Communicates with the first chamber to regulate pressure. Includes the Throttle Valve Chamber 301 for fluid regulation.

Also in FIG. 6 is Plunger Assembly 600. Plunger assembly 600 includes 613 Plunger: The central movable part that regulates fluid flow by opening and closing. 613 Plunger is constructed from annealed food grade PEEK plastic for durability and hygiene; 613A Plunger Slot: A slot in the plunger that provides a path from the first internal chamber or pressure zone 103D to the second internal chamber or pressure zone 105D. (See also FIG. 11.) Plunger assembly 600 also includes 603 Plunger Ring: A PEEK thermoplastic sealing ring around the plunger to prevent leaks and maintain pressure zones. 603 Plunger Ring includes 603A Plunger Ring Gap: A specific gap in the ring, precisely engineered for controlled fluid communication between chambers. It will be appreciated that 603A Plunger Ring Gap may be any suitable gap, such as $1/16$-inch gap, to control pressure differential between Internal Chambers 103D, 105D. It will also be understood that plunger 613 fits loosely within the plunger body allowing a fluid communication gap 601 of about 0.01-inches around plunger 613. The 0.01-inch gap 601 between the plunger and the plunger body ensures smooth operation without excessive friction, while allowing precise fluid flow control.

It will be appreciated that plunger 613 is constructed from PEEK thermoplastic which is superior over other materials for use as a plunger within the plunger body as described herein. For example, the sliding action of a stainless-steel plunger would cause galling between the plunger and wall. The sealing area would get a peening action over time and damage the sealing surface and same for the surface behind it. And, the chamfered sealing end 617 of the outlet body, also stainless steel, against a stainless-steel piston would not provide the desired sealing when the piston is in the closed position. Other types of plastics, e.g., PTFE, are also not suitable due to their coefficients of thermal expansion.

Figure 6A:
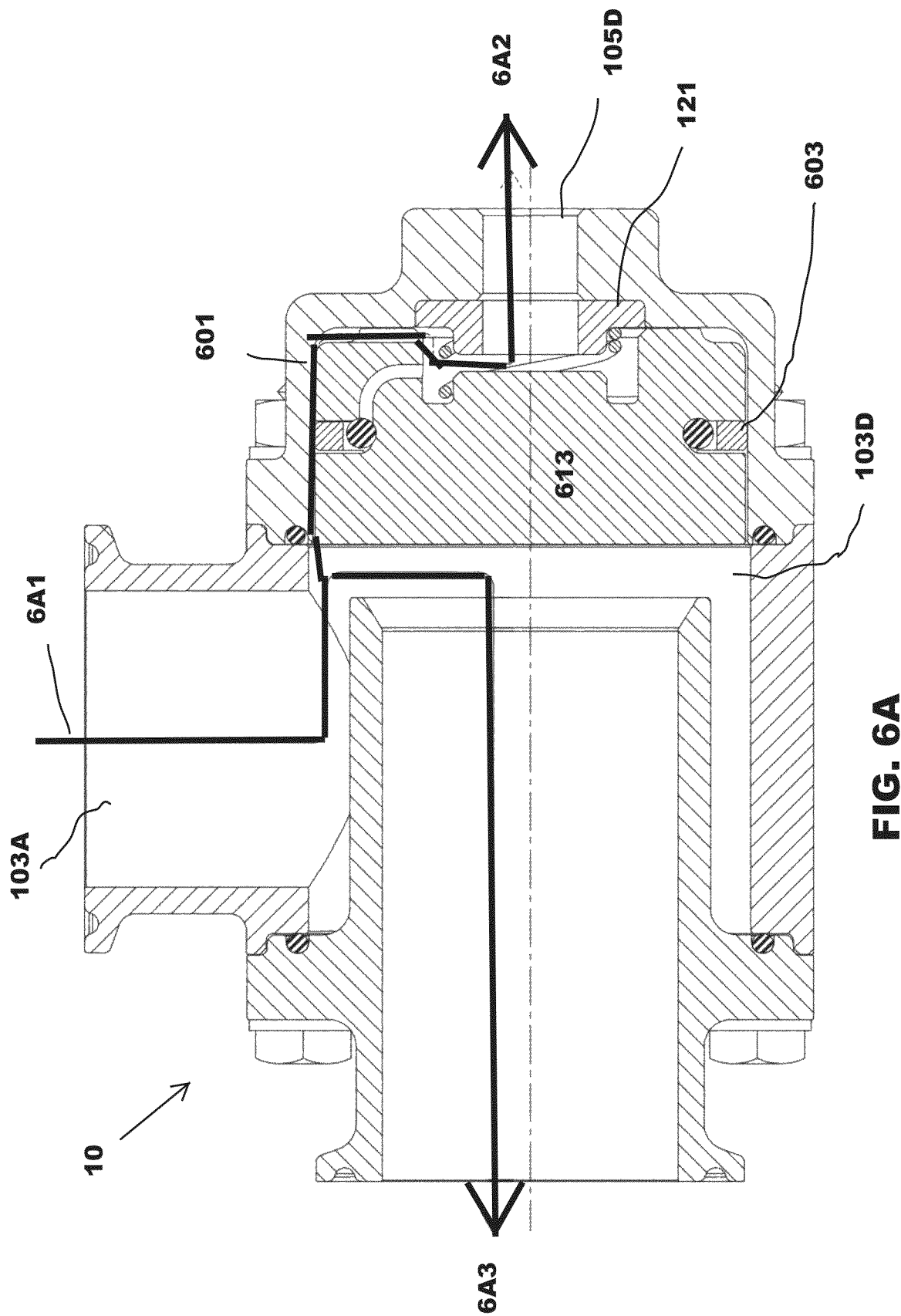
FIG. 6A is a side cutaway view of the pulse valve in the open position, taken along the line 6-6 in FIG. 5.

Referring also to FIG. 6A there is shown a side cutaway view of the pulse valve 10 in the open position, taken along the line 6-6 in FIG. 5. Compressed airflow 6A1 through inlet port 103a is divided into two paths: output compressed airflow 6A3 and 6A2 through gap 601 between plunger and plunger body wall, through plunger ring gap 603A (see FIG. 10), through plunger gap 613A (see FIG. 11), through second internal chamber or pressure zone 105D when air is allowed to escape internal chamber 105D. It will be appreciated that the pressure in zone 103D is greater than the pressure in 105D, thus keeping the plunger in the open position as shown in FIG. 6A. When air is not allowed to escape chamber 105D the pressure difference between chamber 103D and 105D is substantially zero which lets compression spring 607 expand pushing plunger 613 against sealing edge 617 (see FIG. 6).

Also, in FIG. 6 are sealing and support mechanisms. 605 O-Ring Under Plunger Ring: Provides a seal below the plunger ring to prevent leaks. 607 Spring: A compression spring that restores the plunger to its original position after operation. 121 Spring Seat: Supports the spring and maintains alignment, made of PEEK material.

Still referring to FIG. 6 there is shown 615 Chamfered Edge of the outlet body 101. The internal end of the outlet body 101 is chamfered to provide a sealing edge 617 ensuring a tight seal against the plunger 613. It will be appreciated that the pounds per square inch force of the 617 chamfered edge on the plunger is increased as the width of the 617 sealing edge is reduced. The best width may be any suitable width such as 0.032 inches wide.

Still referring to FIG. 6 there is shown 609 O-Ring Between Outlet and Center: Ensures no fluid leakage between the outlet body and the center body. 611 O-Ring Between Center and Plunger Body: Provides a seal between the plunger body and the center body.

Figure 7:
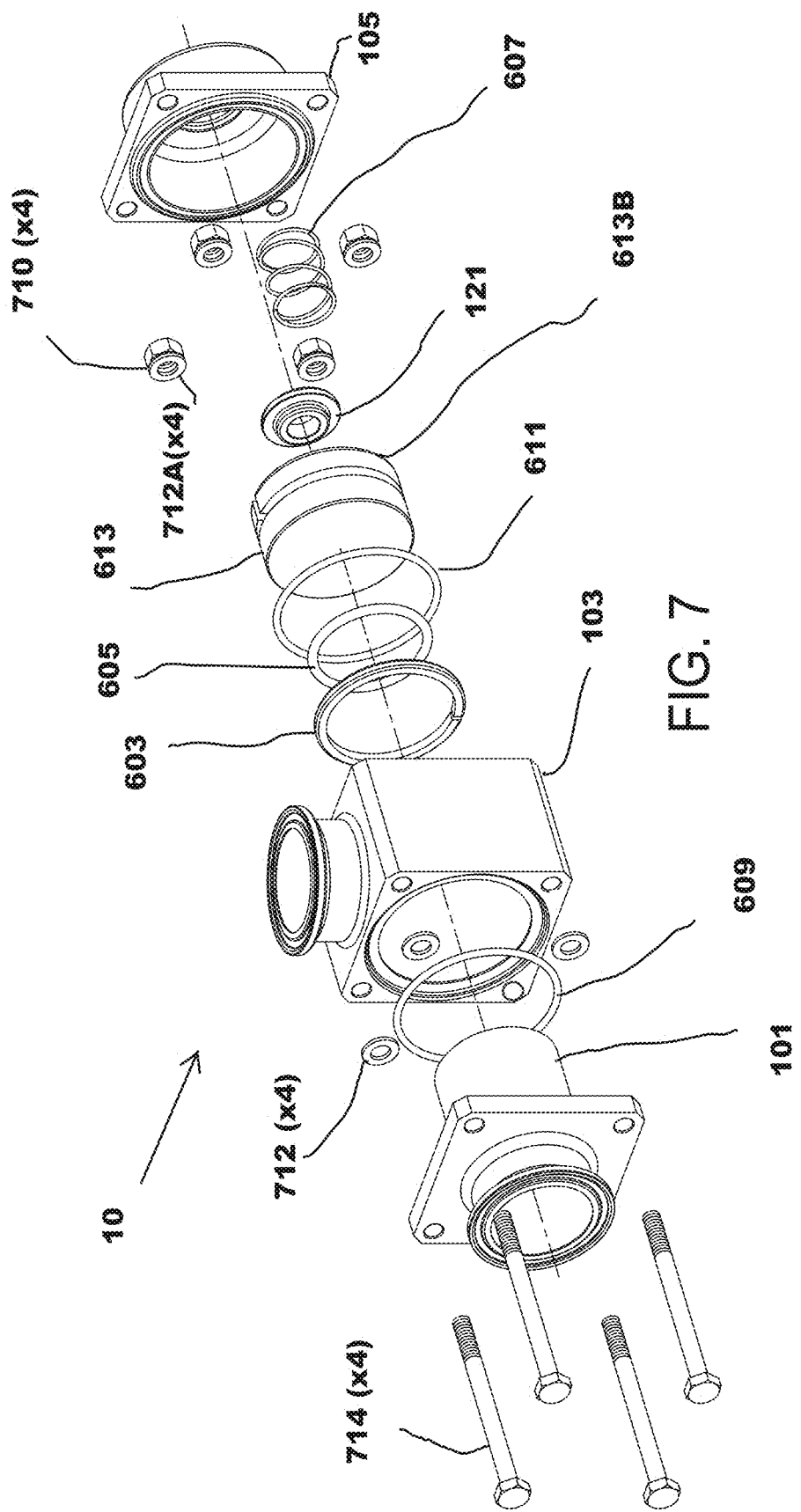
FIG. 7 is an exploded view of the pulse valve in FIG. 1.

Referring also to FIG. 7 there is shown an exploded view of the pulse valve 10 in FIG. 1. FIG. 7 shows the internal components discussed herein, highlighting spatial relationships and functional alignment. FIG. 7 offers a comprehensive view of the pulse valve's 10 internal engineering, showing how its parts work together to achieve precision fluid control in hygienic applications and emphasizes ease of assembly and maintenance.

Figure 8:
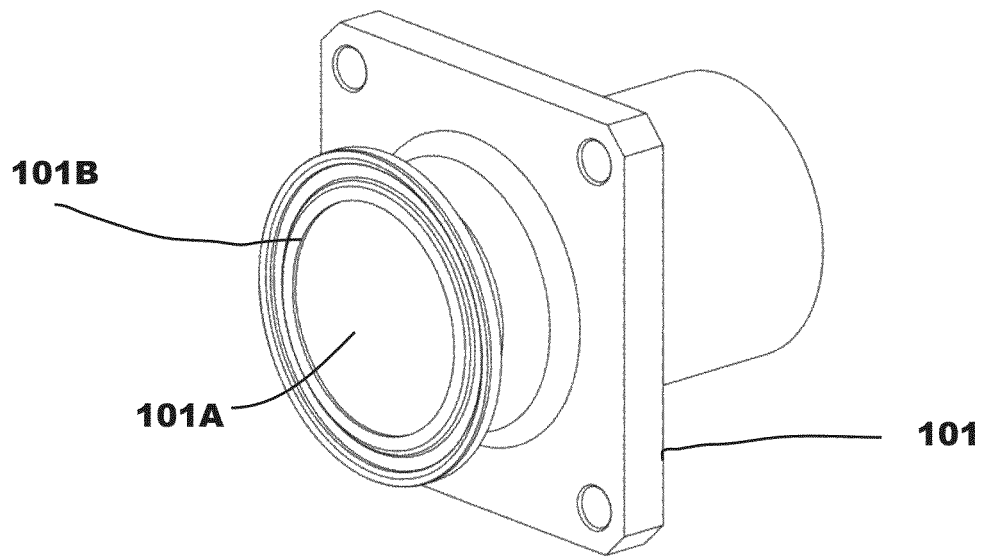
FIG. 8 is a perspective view of the outlet body of the pulse valve in FIG. 1.

Referring also to FIG. 8 there is shown a perspective view of the outlet body 101 of the pulse valve 10 in FIG. 1. The outlet body 101 is a critical part of the pulse valve system, designed as the exit point for the compressed fluid. It houses the compressed fluid outlet port 101A, which is machined to an RA32 finish 101B to meet food-grade sanitary standards.

Figure 9:
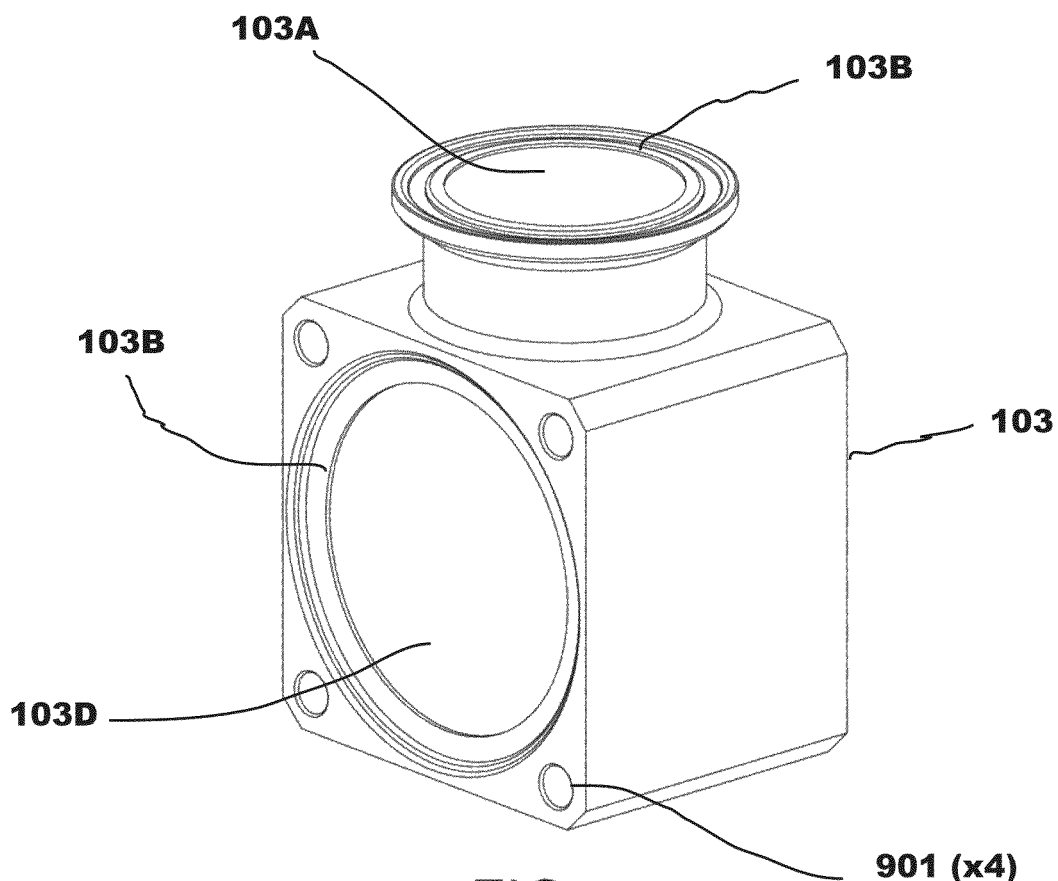
FIG. 9 is a perspective view of the center body of the pulse valve in FIG. 1.

Referring also to FIG. 9 there is shown a perspective view of the center body 103 of the pulse valve 10 in FIG. 1. The center body 103 serves as a bridge between the outlet body 101 and the plunger body 105. It includes the compressed fluid supply port 103A, which directs fluid into the first pressure zone 103D. Machined bolt holes 901 are isolated from the valve's internal pathways to maintain a fully sanitary environment. This feature prevents contamination and simplifies maintenance.

Figure 10:
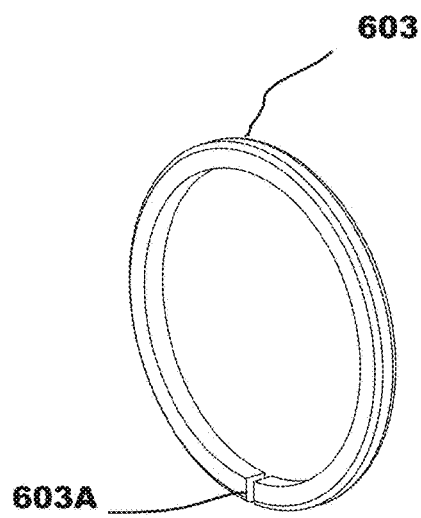
FIG. 10 is a perspective view of a plunger ring in accordance with the invention in FIG. 1.

Referring also to FIG. 10 there is shown a perspective view of the plunger ring 603 in accordance with the pulse valve 10 in FIG. 1. The plunger ring 603 is a sealing component made of food-grade PEEK thermoplastic, which is critical for ensuring fluid-tight zones within the pulse valve. It includes a $1/16$-inch break 603A that allows controlled fluid communication between the first and second internal chambers 103D and 105D. PEEK plunger 613 ensures high resistance to temperature, chemicals, and wear, making it ideal for hygienic and demanding environments.

Figure 11:
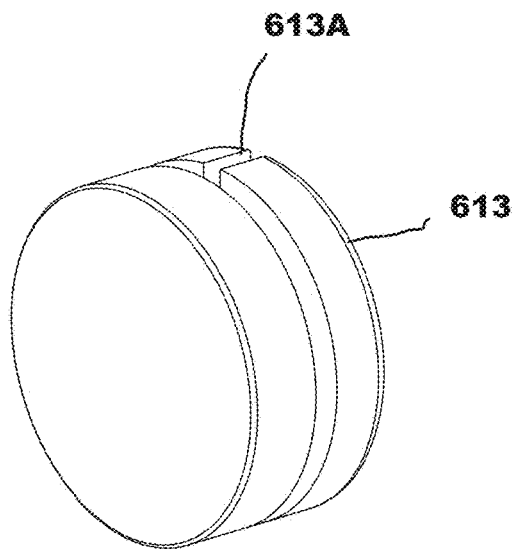
FIG. 11 is a perspective view of a plunger in accordance with the invention in FIG. 1.

Referring also FIG. 11 there is shown a perspective view of the plunger 613 in accordance with the pulse valve 10 in FIG. 1. The plunger 613 is a central moving part within the valve 10, responsible for controlling the flow of compressed air or fluid by transitioning between open and closed positions. The plunger 613, made from annealed PEEK thermoplastic, is designed for durability and compliance with food-grade standards. It will be appreciated that the plunger break or gap 613A may be any suitable gap to facilitate fluid communication between chambers 103D and 105D shown in FIG. 6.

Figure 12:
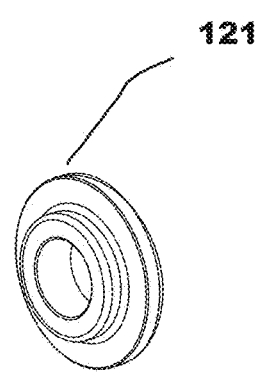
FIG. 12 is a perspective view of spring seat in accordance with the invention in FIG. 1.

Referring also to FIG. 12 there is shown a perspective view of spring seat 121 in accordance with the pulse valve 10 in FIG. 1. It will be appreciated that spring seat 121 is made from food grade annealed PEEK thermoplastic. Provides a stable base for the spring 607, maintaining its alignment during operation. Designed for easy cleaning and replacement as part of routine maintenance due to its easy accessibility.

Figure 13:
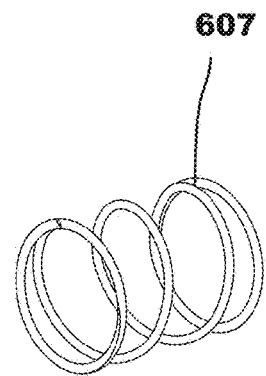
FIG. 13 is a perspective view of compression spring in accordance with the invention in FIG. 1.

Referring also to FIG. 13 there is shown a perspective view of compression spring 607 in accordance with the pulse valve 10 in FIG. 1. It will be appreciated that the compression spring may be any suitable food grade spring constructed in accordance with U.S. food grade standards. Such as, for example food grade stainless steel or a nickel-chromium based supper alloy. The compression spring 607 is a mechanical element responsible for restoring the plunger 613 to its closed position when the pressure differential between internal chambers 103D and 105D equalizes. The compression spring is easily replaceable, minimizing downtime during maintenance.

Figure 14:
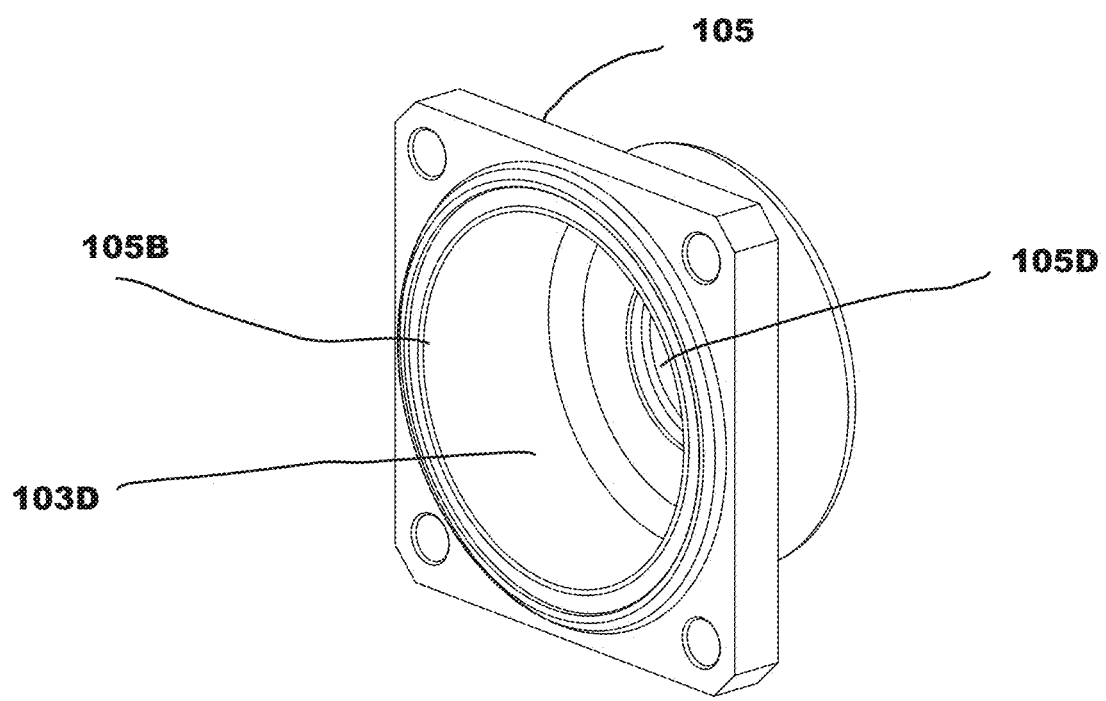
FIG. 14 is a perspective view of the plunger body of the pulse valve in FIG. 1.

Referring also to FIG. 14 there is shown a perspective view of the plunger body 105 of the pulse valve 10 in FIG. 1. The plunger body 105 is one of the main structural components of the pulse valve. It houses the internal chambers that regulate fluid flow and serves as a central interface for the plunger assembly 600. The First Internal Chamber 103D is a cylindrical cavity that serves as the primary pressure zone where fluid enters from the compressed fluid supply port 103A and maintains fluid flow and pressure before it interacts with the plunger 613 and second chamber 105D.

Still referring to FIG. 14, the second Internal Chamber 105D is in constant fluid communication with the first internal chamber 103D. The second Internal Chamber 105D contains the throttle valve port 301 connectable to any suitable throttle valve (not shown in the drawings) for regulating fluid flow to the outlet body 101. Pressure differences between the first and second chambers 103D, 105D control the movement of the plunger 613. FIG. 14 illustrates the plunger body 105 as a critical component in the pulse valve's overall design. It highlights how the component integrates sanitary and functional features to achieve precise control, durability, and compliance with hygienic standards. The plunger body's dual-chamber design, polished surfaces, and innovative sealing mechanisms ensure it excels in food-grade and other sensitive applications.

Figure 15:
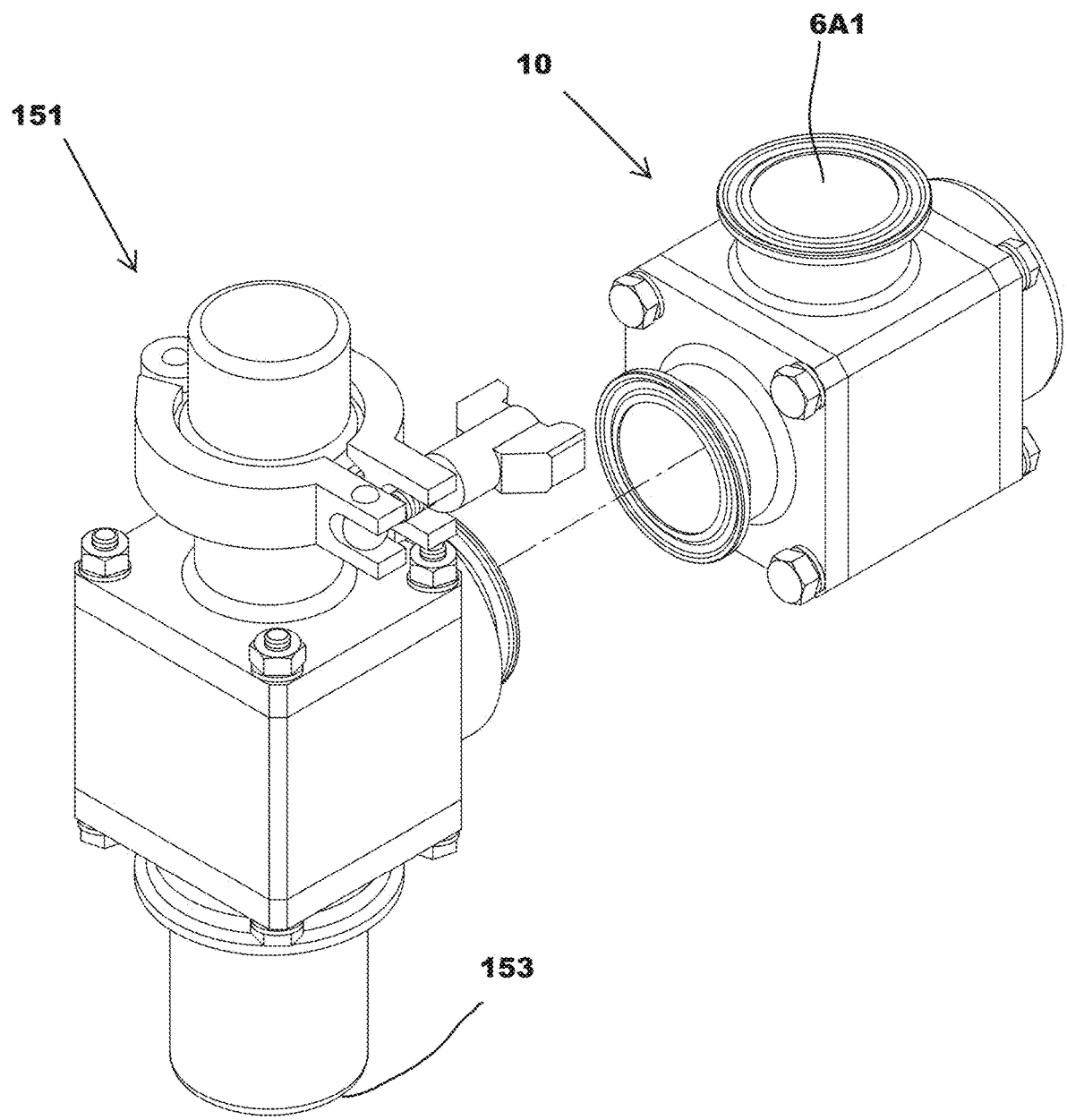
FIG. 15 is a perspective view of an operational environment of the pulse valve in FIG. 1.

Referring also to FIG. 15 there is shown a perspective view of an operational environment of the pulse valve 10 in FIG. 1. This figure highlights how the valve integrates with external systems, such as compressed air supply systems, fluid piping networks, and food-grade processing equipment. For example, pulse valve 10 is connectable to a bin aerator 151 such as described in U.S. Pat. No. 10,464,742. Upon receipt of compressed air from pulse valve 10 piston head 153 extends to let compressed air escape around the piston head 153 circumference. By combining the pulse valve 10 with aerators 151, the combined system achieves efficient material management, particularly in industries handling powdered or granular substances (e.g., cement, grain, pharmaceuticals).

Operational Description

Referring to FIGS. 1-15. The invention relates to a food-grade sanitary pulse valve 10 designed to regulate fluid flow in hygienic environments. The valve 10 features a plunger body 105 composed of two connected cylindrical chambers 103D and 105D. The first chamber 103D has RA32 smooth walls and serves as the initial zone for fluid intake, while the second chamber 105D, which includes a throttle valve chamber, is constantly in communication with the first chamber. These chambers work together to control pressure and flow within the system.

The valve also includes an outlet body 101 and a center body 103. Center body 103 includes a supply port 103A that connects to the first chamber 103D to provide compressed fluid. Inside the first chamber 103D, there is a cylindrical plunger assembly 600 capable of transitioning between open and closed positions. In the open position, the plunger assembly 600 allows fluid flow (e.g., compressed air, compressed nitrogen) from the supply port 103A to the outlet port 101A, and in the closed position, the flow is stopped.

A key feature of the outlet body 101 is a chamfered sealing edge 617 substantially 0.032 inches wide, designed to create a tight seal against the plunger 613 when closed. The plunger 613 is made of durable food grade PolyEtherEtherKetone (PEEK) plastic and incorporates a small gap 613A to help with fluid communication between the first and second chambers 103D and 105D. Surrounding the plunger 613 is a sealing ring 603, also made of PEEK plastic, which fits tightly between the plunger 613 and the plunger chamber wall to prevent leakage. Sealing ring 603 includes a 1/16-inch break 603A that allows controlled fluid communication between the supply port and the second chamber. The gap between the plunger and the chamber wall is substantially 0.01 inches wide, ensuring precision in fluid management.

To regulate the plunger's movement, a compression spring is installed within the first chamber, supported by a spring seat made of food grade PEEK plastic. Additional sealing mechanisms include food grade O-rings positioned between the plunger body, center body, and outlet body to enhance durability and prevent leaks.

A specific variation of the valve introduces two pressure zones 103D and 105D within the plunger body, separated by food grade PEEK thermoplastic plunger assembly 600. The plunger assembly includes sealing plunger ring 603. Sealing ring 603 includes a break 603A to allow pressure equalization between the zones 103D and 105D. The outlet body in this variation features a chamfered sealing edge 617 (0.032 inches wide) that seals against the plunger 613 when closed. When pressure in both zones is equal, the plunger 613 seals tightly against the sealing edge 617 by compression spring 607, halting output airflow.

It will be appreciated that the present invention provides several areas of improvement over the prior art. The pulse valve's 10 design includes a plunger ring 603 with a precise 1/16-inch break and a 0.01-inch gap between the plunger 613 and the plunger body 105, allowing controlled and consistent fluid communication between chambers 103D and 105D. This ensures ideal flow rates and prevents blockages, making it more reliable than prior designs that lack precise gap control.

The sealing edge 617 (0.032 inches wide) provides a superior sealing surface when flush against PEEK thermoplastic plunger 613 compared to traditional flat-edge designs. Thus, promoting a stronger sealing factor when the valve is in the off position. This reduces wear and tear during repeated operations, significantly extending the valve's 10 lifespan.

Using PEEK thermoplastic for critical components such as the plunger 613, sealing ring 603, and spring seat 121 ensures resistance to high temperatures, chemicals, and wear. PEEK's durability outperforms stainless steel in sliding applications, as it prevents galling and peening, which are common in metal-to-metal contact.

All internal surfaces are machined to an RA32 finish or smoother, eliminating debris traps and ensuring easy cleaning. This makes the valve 10 ideal for food-grade applications where contamination risks must be minimized.

The dual pressure zone design 103D and 105D with a throttle valve chamber ensures stable pressure management, reducing the risk of valve failure under high-pressure conditions. This stability out performs designs that rely only on single-zone pressure control.

The absence of diaphragms and internal fasteners enhances the valve's versatility, letting it operate efficiently in environments requiring frequent cleaning and maintenance.

Components like the O-rings, compression spring, and PEEK spring seat are designed for easy replacement, reducing maintenance downtime compared to conventional valves.

The valve's design, particularly the use of corrosion-resistant materials and precise sealing mechanisms, ensures long-term reliability even in harsh operating conditions such as high-humidity or chemically aggressive environments.

It should be understood that the foregoing description is only illustrative of the invention. The present invention is intended to embrace all such alternatives, changes and variances which fall within the scope of the appended claims.

What is claimed is:

1. A sanitary pulse valve (SPV) comprising:
    a SPV plunger body, wherein the SPV plunger body comprises:
        a first SPV internal chamber defining a substantially cylindrical interior cavity having a first SPV wall;
        a second SPV internal chamber defining a substantially cylindrical interior cavity having a second SPV wall, and wherein the second SPV internal chamber is in constant fluid communication with the first SPV internal chamber, wherein the second internal chamber comprises:
            a throttle valve chamber;
        a SPV outlet body, wherein the SPV outlet body comprises:
            a compressed fluid outlet port;
    a compressed fluid supply port for supplying compressed fluid to the compressed fluid outlet port, and wherein the compressed fluid supply port is in constant fluid communication with the first SPV internal chamber; and
    a substantially cylindrical SPV plunger disposed within the first SPV internal chamber, and wherein the substantially cylindrical SPV plunger comprises an open position for allowing fluid communication between the compressed fluid supply port and the compressed fluid outlet port and a closed position for stopping fluid communication between the compressed fluid supply port and the compressed fluid outlet port, wherein the SPV plunger comprises:
        a PolyEtherEtherKetone (PEEK) thermoplastic plunger, wherein the PEEK thermoplastic plunger comprises:
            a first gap for fluid communication between the first and second internal chambers.

2. The SPV pulse valve as in claim 1 wherein the SPV outlet body comprises a RA32 surface finished chamfered end for sealing against the substantially cylindrical SPV plunger when the substantially cylindrical SPV plunger is in the closed position.

3. The SPV pulse valve as in claim 2 wherein the chamfered end for sealing against the substantially cylindrical SPV plunger is approximately 0.032-inches wide.

4. The SPV pulse valve as in claim 1 wherein the SPV plunger further comprises a sealing SPV plunger ring disposed around the SPV plunger and wherein the SPV plunger ring seals a second gap between the substantially cylindrical SPV plunger and the first SPV wall.

5. The SPV pulse valve as in claim 4 wherein the SPV plunger ring comprises a PEEK thermoplastic plunger ring.

6. The SPV pulse valve as in claim 4, wherein the second gap is substantially 0.01 inches.

7. The SPV pulse valve as in claim 4 wherein the SPV plunger ring comprises at least one gap for allowing fluid communication between the compressed fluid supply port and the second SPV internal chamber.

8. The SPV pulse valve as in claim 7 wherein the at least one gap comprises a 1/16-inch break.

9. The SPV pulse valve as in claim 1 wherein the first SPV internal chamber further comprises:
    a compression spring;
    a spring seat, wherein the spring seat is disposed between the compression spring and the second SPV internal chamber.

10. The SPV pulse valve as in claim 9 wherein the spring seat comprises a PEEK thermoplastic spring seat.

11. A pulse valve comprising:
    a stainless-steel machined (SSM) plunger body, wherein the SSM plunger body comprises:
        a first internal chamber defining a first substantially cylindrical interior cavity having a first wall;
        a second internal chamber defining a second substantially cylindrical interior cavity having a second wall, and wherein the second internal chamber is in constant fluid communication with the first internal chamber, wherein the second internal chamber comprises:
            a throttle valve chamber;
    a SSM outlet body, wherein the outlet body comprises:
        a compressed fluid outlet port; and
    a SSM center body disposed between the SSM plunger body and the SSM outlet body, wherein the SSM center body comprises:
        a compressed fluid supply port for supplying compressed fluid to the compressed fluid outlet port, and wherein the compressed fluid supply port is in constant fluid communication with the first internal chamber;
    wherein the SSM plunger body, the SSM center body, and the SSM outlet body each comprise interior surfaces with a RA32 finish, and wherein the pulse valve does not comprise a diaphragm, and wherein the pulse valve does not have interior radii less than 0.032 inch radius and wherein the pulse valve has no internal fasteners; and
    a substantially cylindrical plunger disposed within the first internal chamber, and wherein the substantially cylindrical plunger comprises:
        an open position for allowing fluid communication between the compressed fluid supply port and the compressed fluid outlet port and a closed position for stopping fluid communication between the compressed fluid supply port and the compressed fluid outlet port.

12. The pulse valve as in claim 11 wherein the outlet body comprises a circular chamfered end for sealing against the substantially cylindrical plunger when the substantially cylindrical plunger is in the closed position and wherein the chamfered end for sealing against the substantially cylindrical plunger is substantially 0.032-inches wide.

13. The pulse valve as in claim 12 wherein the plunger comprises:
    a PolyEtherEtherKetone (PEEK) thermoplastic plunger, wherein the PEEK thermoplastic plunger comprises:
        a first gap for allowing fluid communication between the first and second internal chambers;
        a first food grade O-ring disposed around the PEEK plunger;
        a sealing plunger ring disposed around the first food grade O-ring, and wherein the sealing plunger ring substantially seals a second gap between the substantially cylindrical plunger and the first wall, and wherein the plunger ring comprises:
  a PEEK thermoplastic plunger ring.

14. The pulse valve as in claim 13, wherein the second gap is approximately 0.01 inches.

15. The pulse valve as in claim 13, wherein the sealing plunger ring comprises one gap for allowing fluid communication between the compressed fluid supply port and the second internal chamber.

16. The pulse valve as in claim 15 wherein the one gap comprises a substantially 1/16-inch break.

17. The pulse valve as in claim 11 wherein the first internal chamber further comprises:
  a compression spring;
  a spring seat, wherein the spring seat is disposed between the compression spring and the second internal chamber, and wherein the spring seat comprises a PEEK thermoplastic spring seat.

18. The pulse valve as in claim 13 further comprising:
  a second food grade O-ring disposed between the plunger body and the center body; and
  a third food grade O-ring disposed between the center body and the outlet body.

19. A sanitary pulse valve comprising:
  a plunger body, wherein the plunger body comprises:
    a first pressure zone;
    a PolyEtherEtherKetone (PEEK) thermoplastic plunger, wherein the PEEK thermoplastic plunger is disposed between the first pressure zone and a second pressure zone;
    a PEEK thermoplastic sealing plunger ring disposed around the PEEK thermoplastic plunger substantially separating the first and second pressure zones, and wherein the PEEK thermoplastic sealing plunger ring further comprises:
      a substantially 1/16-inch break for maintaining constant fluid communication between the first pressure zone and the second pressure zone;
  an outlet body comprising:
    a compressed fluid outlet port;
    a chamfered end for sealing against the PEEK thermoplastic plunger when the plunger is in a closed position and wherein the chamfered end for sealing against the PEEK thermoplastic plunger is substantially 0.032-inches wide;
  a center body disposed between the plunger body and the outlet body, wherein the center body comprises:
    the second pressure zone;
    a compressed fluid supply port for supplying compressed fluid to the first pressure zone and a compressed fluid outlet port, and wherein the compressed fluid supply port is in constant fluid communication with the first pressure zone; and
  wherein when pressure in the first pressure zone substantially equals pressure in the second pressure zone the PEEK thermoplastic plunger is sealed against the outlet body chamfered end stopping compressed fluid flow between the compressed fluid supply port and the compressed fluid outlet port.

20. The sanitary pulse valve as in claim 19 wherein:
the PEEK thermoplastic plunger comprises a carbon filled PEEK thermoplastic plunger; and
the PEEK thermoplastic plunger ring comprises a carbon filled PEEK thermoplastic plunger ring.

21. The sanitary pulse valve as in claim 19 wherein:
the PEEK thermoplastic plunger comprises a glassed filled PEEK thermoplastic plunger; and
the PEEK thermoplastic plunger ring comprises a glass filled PEEK thermoplastic plunger ring.

* * * * *